A. HILL.
CASTER AND FITTING.
APPLICATION FILED DEC. 27, 1912. RENEWED FEB. 13, 1914.
1,102,508.  Patented July 7, 1914.
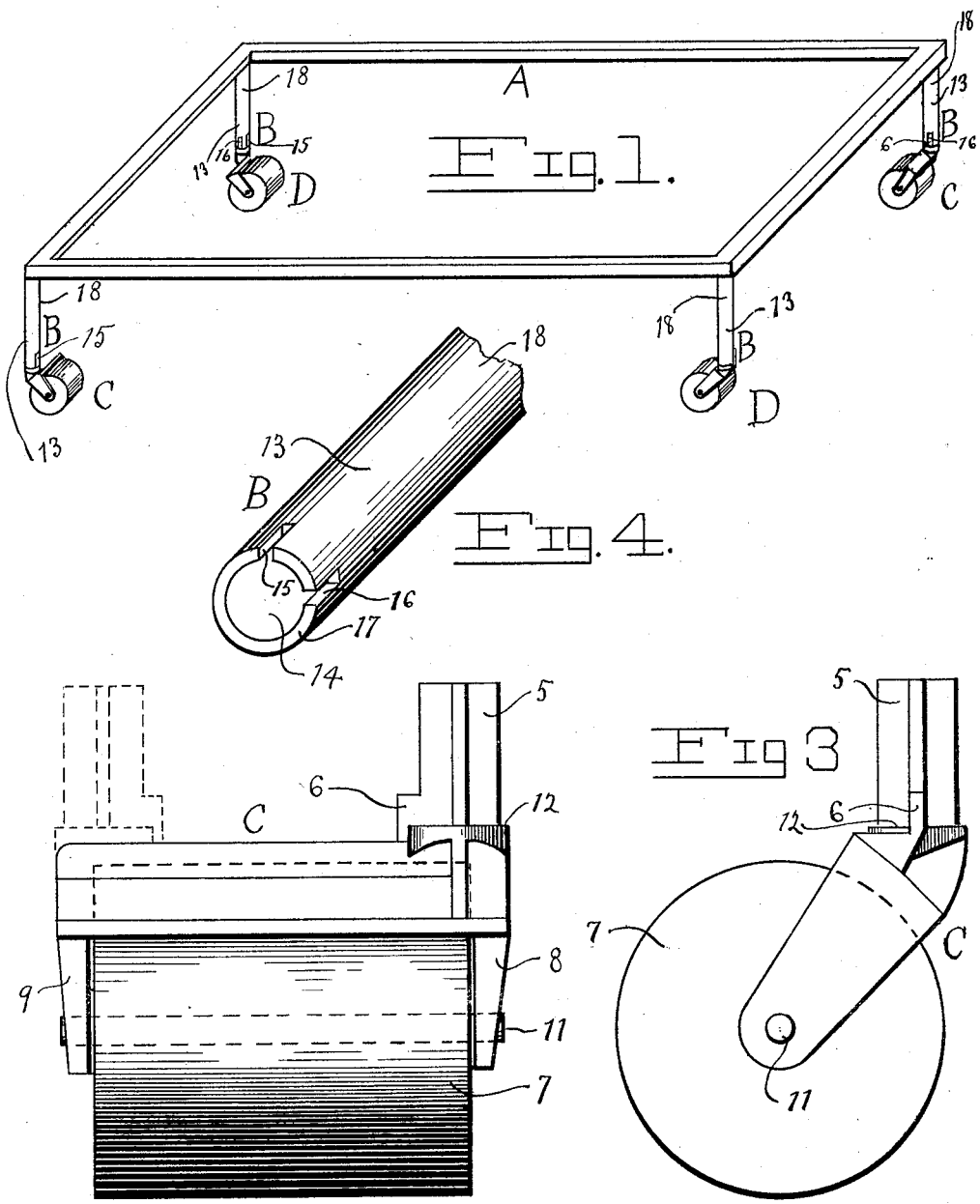
WITNESSES
Alfred H. Daehler
D. M. Cummings
INVENTOR,
Aaron Hill;
by Raymond &c.
HIS ATTORNEY

UNITED STATES PATENT OFFICE.

AARON HILL, OF LOS ANGELES, CALIFORNIA, ASSIGNOR OF ONE-FOURTH TO RAYMOND IVES BLAKESLEE, OF LOS ANGELES, CALIFORNIA.

CASTER AND FITTING.

1,102,508.

Specification of Letters Patent.

Patented July 7, 1914.

Application filed December 27, 1912, Serial No. 738,785. Renewed February 13, 1914. Serial No. 818,607.

*To all whom it may concern:*

Be it known that I, AARON HILL, a citizen of the United States, residing near Los Angeles, in the county of Los Angeles and State of California, have invented new and useful Improvements in Casters and Fittings, of which the following is a specification.

This invention relates to casters and fittings, and more particularly to casters and fittings for disappearing or chambered or housed beds and the like, which when not in use may be run into suitable compartments or closets provided in the wall or other structural part of a room or apartment for their reception. The use of sufficiently large casters to provide the requisite bearing surfaces are essential with beds of this character, to prevent the marring of floors or damaging of rugs; this results in standard practice in casters which defeat the object of conservation of space which is the primary object of the use of beds of this character.

The invention has for its object to provide improvements in casters and fittings which will bring the use of the same within the practice pertinent to conservation of space; and in carrying out the invention I provide casters and fittings therefor so organized and co-acting as to cause the casters always to be within the area of the superposed bed frame, no matter how the casters may be disposed to provide for a definite direction of movement of the bed.

The invention consists in the novel and useful construction and organization of parts, members and features all as hereinafter described, shown in the drawing, and finally pointed out in claims, the invention having for further objects the provision of improvements of the nature and structure which will be superior in point of simplicity, inexpensiveness of organization, positiveness and efficiency in service and durability, facility in attachment and detachment and adjustment, and general serviceability.

In the drawing: Figure 1 is an isometric view of a bed frame provided with my improved casters and fittings; Fig. 2 is a side elevation of a detached caster; Fig. 3 is an end elevation; and, Fig. 4 is an isometric view of a fitting, parts being broken away.

Referring with particularity to the drawing, A designates a bed frame provided with fittings B and mounted upon caster members C and D, said fittings B and caster members C and D being the portions to which the invention particularly pertains. These caster members comprises each a shank portion 5 provided with an integral laterally extending lug or key 6, said shank being bifurcated at its lower end to receive a roller 7, one of the furcations 8 being disposed in approximately the same plane as the shank while the other furcation 9 is offset laterally so as to project under the bed frame A, both said furcations 8 and 9 ranging slantingly forward to such extent as is necessary to project the rollers 7 completely under the bed frame A. The rollers may be rotatably mounted in any preferred manner as upon pins or axles 11; a shoulder 12 is provided for co-engagement with the fitting B; the fittings B comprise each a member 13 provided with a shank receiving orifice 14 and lug receiving notches 15 and 16, said notches 15 and 16 being spaced apart ninety degrees in the wall 17, which is preferably annular.

In Fig. 1 the fittings B are shown as being integral with or constituting the legs 18 of the bed frame A with the notches 15 facing inwardly in directions parallel to the longitudinal trend of the bed frame while the notches 16 are shown facing inwardly in directions parallel to the lateral trend of said bed frame. The object in thus placing the slots at right angles to each other is to provide interchangeability of the casters C and D, as will presently be described, and thus change the paths of movement of said casters, with a consequent change in direction of travel permitted the bed frame, from longitudinal, as shown in Fig. 1, to lateral. In order to accomplish this change in the direction of travel of said bed frame the casters C and D are made "rights" and "lefts" respectively, that is the furcations 9 of casters C are offset to the right of the shank 5 while the furcations 9 of casters D are reversed or offset to the left of the shanks 5. This difference is indicated by dotted lines in Fig. 2. The lugs 6 of all the casters when positioned as shown in Fig. 1 occupy the laterally facing notches 16 and when casters C and D are interchanged with the object of permitting sidewise or lateral movement of the bed frame A the lugs 6 of all the casters occupy the longitudinally facing notches 15, it being understood that in each case the shank 5 is introduced into the shank receiving orifice 14, this arrangement keeping the casters, in either position, entirely within the area of the superposed bed frame.

I do not desire to be understood as limiting myself to the particular formation, combination and inter-relation of parts members and features shown and described; but reserve the right to vary the same in adapting the improvements to varying conditions of use, all within a fair interpretation of the spirit of the invention.

Having thus described my invention, I claim and desire to secure by Letters Patent:

1. A caster provided with a shank bifurcated to embrace and hold a roller with the shank disposed adjacent to one end of the axis of said roller.

2. A caster provided with a shank bifurcated to embrace and hold a roller with the shank disposed adjacent to one end and at one side of the axis of said roller.

3. A bed having a caster and a roller carried thereby, and means for retaining said roller fixedly and entirely within the area of the superposed bed.

In testimony whereof, I have signed my name to this specification in the presence of two subscribing witnesses.

AARON HILL.

Witnesses:
CHAS. DUYLER,
R. I. BLAKESLEE.

Copies of this patent may be obtained for five cents each, by addressing the "Commissioner of Patents, Washington, D. C."